United States Patent
Lin

(10) Patent No.: US 9,624,961 B2
(45) Date of Patent: Apr. 18, 2017

(54) SCREW

(71) Applicant: Fushang Co., Ltd., Kaohsiung (TW)

(72) Inventor: Jung-Nan Lin, Kaohsiung (TW)

(73) Assignee: Fushang Co., Ltd., Kaohsiung (TW)

( * ) Notice: Subject to any disclaimer, the term of this patent is extended or adjusted under 35 U.S.C. 154(b) by 9 days.

(21) Appl. No.: 14/801,954

(22) Filed: Jul. 17, 2015

(65) Prior Publication Data

US 2017/0016468 A1 Jan. 19, 2017

(51) Int. Cl.
*F16B 25/10* (2006.01)
*F16B 25/00* (2006.01)

(52) U.S. Cl.
CPC ...... *F16B 25/0042* (2013.01); *F16B 25/0015* (2013.01)

(58) Field of Classification Search
CPC .. F16B 25/10; F16B 25/0036; F16B 25/0042; F16B 25/0057; F16B 25/0063; F16B 25/0078; F16B 35/04; F16B 35/041
USPC .............. 411/387.1, 399, 402, 411–412, 424
See application file for complete search history.

(56) References Cited

U.S. PATENT DOCUMENTS

| | | | | |
|---|---|---|---|---|
| 3,524,378 A * | 8/1970 | Wieber | ................. | F16B 5/0275 411/387.3 |
| 3,903,784 A | 9/1975 | Dekker | | |
| 4,655,661 A * | 4/1987 | Brandt | ................ | F16B 25/0031 408/224 |
| 5,199,839 A * | 4/1993 | DeHaitre | ............ | F16B 23/0076 411/387.3 |
| 8,616,816 B2 * | 12/2013 | Pieciak, Jr. | ............. | F16B 25/00 411/387.2 |
| 8,864,431 B2 * | 10/2014 | Su | ........................ | F16B 25/0084 411/387.1 |
| 2002/0110439 A1 * | 8/2002 | Craven | .................. | F16B 5/0275 411/413 |
| 2004/0141827 A1 * | 7/2004 | Dicke | ................... | F16B 5/0275 411/413 |
| 2007/0059122 A1 * | 3/2007 | Lin | ........................ | F16B 5/0275 411/412 |

(Continued)

FOREIGN PATENT DOCUMENTS

| | | |
|---|---|---|
| AT | 379873 B | 3/1986 |
| CA | 2833847 A1 | 5/2015 |

(Continued)

*Primary Examiner* — Roberta Delisle
(74) *Attorney, Agent, or Firm* — Alan D. Kamrath; Kamrath IP Lawfirm, P.A.

(57) ABSTRACT

A screw includes a shank having an insertion tip and a head end which has an upper portion with a cutting portion and a lower portion from which a plurality of anti-screw-out teeth protrude. Each anti-screw-out tooth includes a guide face and a stop face intersecting a circumferential surface of the lower portion for development of a recessed channel. A first thread on the shank includes a plurality of asymmetrical thread convolutions each having a first cutting face facing onto the insertion tip and a second cutting face backing onto the insertion tip. The first cutting face and a horizontal axis form an included angle between 25 and 45 degrees. The second cutting face and the horizontal axis form an included angle between 3 and 23 degrees. The screw is in favor of surface flatness of a to-be-connected plank and pull-out as well as anti-screw-out properties of the screw.

15 Claims, 12 Drawing Sheets

(56) References Cited

U.S. PATENT DOCUMENTS

| | | | |
|---|---|---|---|
| 2007/0128001 A1* | 6/2007 | Su | F16B 5/0275 |
| | | | 411/413 |
| 2007/0217887 A1* | 9/2007 | Lin | F16B 23/0015 |
| | | | 411/413 |
| 2007/0297871 A1* | 12/2007 | Lu | F16B 25/0015 |
| | | | 411/387.1 |
| 2008/0031705 A1* | 2/2008 | Severns | F16B 5/0275 |
| | | | 411/413 |
| 2011/0217145 A1 | 9/2011 | Kochheiser et al. | |
| 2013/0039720 A1 | 2/2013 | Shih | |
| 2013/0302110 A1* | 11/2013 | Park | F16B 25/0036 |
| | | | 411/387.1 |

FOREIGN PATENT DOCUMENTS

| | | |
|---|---|---|
| DE | 19831269 A1 | 2/1999 |
| DE | 69527755 T2 | 4/2003 |
| WO | WO 98/40580 A1 | 9/1998 |
| WO | WO2011/143733 A1 | 11/2011 |

* cited by examiner

SCREW

BACKGROUND OF THE INVENTION

The present invention relates to a screw and, more particularly, to a screw suitable for using in wood, construction materials, and similar materials.

A large amount of wood or compound wooden materials mixed and compressed from plastic resin and wood chips are used to produce wooden work-pieces for furniture, decoration and construction, and screws are often used in connection between wooden work-pieces.

A conventional screw 10 for using with wood plank is shown in FIG. 1. The screw 10 includes a round shank 12 and a screw thread 14 disposed on the shank 12. The shank 12 includes an insertion tip 16 and a head end 17. The insertion tip 16 has an end cutting groove 18, and a plurality of ribs 19 protrudes from the head end 17. When the insertion tip 16 of the screw 10 penetrates a plank (work-piece) to be connected, the plank is cut by the end cutting groove 18 and screwed by the screw thread 14 until the head end 17 is embedded into the plank in which a drilled hole is expanded by the plurality of ribs 19.

However, the end cutting groove 18 of the screw 10 extends axially along the shank 12 which makes it difficult for wood chips produced from cutting to be expelled smoothly. Therefore, the screw 10 will be easily obstructed by the waste chips during the process of screwing into the plank, which will require more effort in operation, and the plank will easily crack because of compression. Moreover, the surface flatness of the plank is worsened because the waste chips is released from the drilled hole and left on the plank which is being penetrated by the screw 10. Furthermore, the screw thread 14 in FIG. 1 is forward screwed in the plank without anti-pull-out and anti-screw-out properties. Thus, two planks joined with the screws 10 may teeter when the screws 10 under effects of vibrations or other factors are loosened in a pull-out direction.

BRIEF SUMMARY OF THE INVENTION

It is an objective of the present invention to provide a screw which is applicable to a plank and in favor of surface flatness of the plank penetrated by the screw and pull-out as well as anti-screw-out properties of the screw. Moreover, the capacity of the screw to cut wood fibers and penetrate a wood plank is effectively promoted.

To achieve this and other objectives, a screw of the present invention includes a shank and a first thread. The shank includes an insertion tip, a head end spaced from the insertion tip along a longitudinal axis, and a straight portion defined between the insertion tip and the head end. The head end is greater than the straight portion in an outer diameter and includes an upper portion and a lower portion which is adjacent to the straight portion and tapered toward the straight portion. The upper portion is provided with a pointed cutting portion circumferentially designed at a bottom thereof. A plurality of anti-screw-out teeth protrude from a circumferential surface of the lower portion, and each anti-screw-out tooth includes a guide face and a stop face. An included angle between the guide face and the circumferential surface of the lower portion is between 90 and 180 degrees. A recessed channel is formed between the stop face and the circumferential surface. The first thread is spirally disposed on the straight portion of the shank and includes a plurality of asymmetrical thread convolutions. Each asymmetrical thread convolution has a first cutting face facing onto the insertion tip and a second cutting face backing onto the insertion tip. An included angle between the first cutting face and a horizontal axis perpendicular to the longitudinal axis is between 25 and 45 degrees, and an included angle between the second cutting face and the horizontal axis is between 3 and 23 degrees.

In an embodiment, the circumferential surface of the lower portion is provided with four anti-screw-out teeth spaced from one another at a constant angle. The guide face of each anti-screw-out tooth curvedly extends outward from the circumferential surface in a tangential manner. An included angle between the stop face and the circumferential surface of the lower portion is less than 90 degrees. In another embodiment, the guide face of each anti-screw-out tooth extends outward from the circumferential surface in a tangential manner, so that the lower portion has roughly square cross-sections. An included angle between the stop face and the circumferential surface of the lower portion is greater than 90 degree.

In an embodiment, the straight portion includes a lower section disposed near the insertion tip and an upper section disposed near the head end. The lower section has roughly triangular transverse cross sections, and the upper section has circular transverse cross sections.

In an embodiment, the upper portion is greater than a top end of the lower portion in an outer diameter. A slope is provided on an inner side of the cutting portion. A recess is formed between the cutting portion and the circumferential surface of the top end of the lower portion. Each anti-screw-out tooth includes an upper end extending into the recess and a lower end extending to the upper section of the straight portion. The upper end of each anti-screw-out tooth connects with the slope of the cutting portion or is adjacent to the cutting portion.

The present invention will become clearer in light of the following detailed description of illustrative embodiments of this invention described in connection with the drawings.

DETAILED DESCRIPTION OF THE INVENTION

Figure 1:
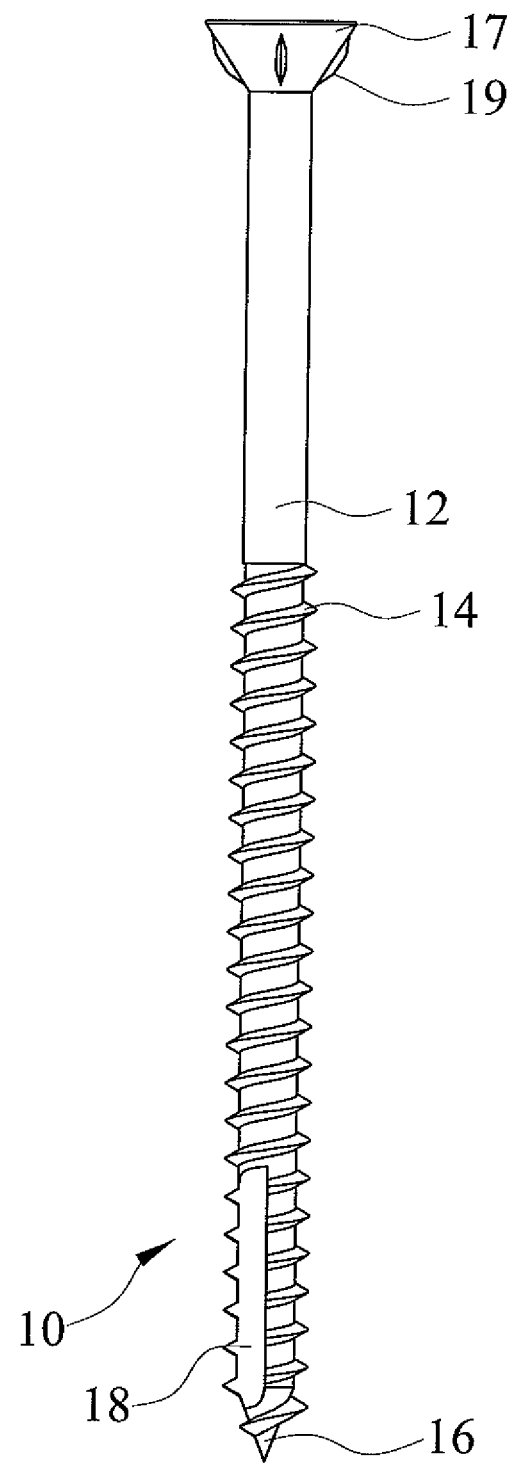
FIG. 1 is a schematic view of a conventional screw.

A screw 20 according to an embodiment of the present invention is shown in FIGS. 2 through 8 of the drawings and includes a shank 22 having an insertion tip 24 and a head end 26 spaced from the insertion tip 24 along a longitudinal axis (X). In this embodiment, the insertion tip 24 is formed as a drilling bit, and an included angle (A) at the insertion tip 24 is between 20 and 50 degrees (see FIG. 7) and is 30 degrees preferably. The shank 22 has a straight portion 28 with roughly the same outer diameter between the insertion tip 24 and the head end 26. The straight portion 28 includes a lower section 30 disposed near the insertion tip 24 and an upper section 32 disposed near the head end 26. The lower and upper sections 30 and 32 respectively have circular transverse cross sections. At least one end cutting groove 34 is formed in the lower section 30. In this embodiment, four end cutting grooves 34 are formed in the lower section 30, circumferentially arranged around the shank 22 and spaced from one another at a constant angle (see FIG. 5). A lower end of each end cutting groove 34 is spaced from the insertion tip 24, and an included angle (B) is formed between the extending direction of each end cutting groove 34 and the longitudinal axis (X). The included angle (B) is between 3 and 9 degrees preferably (see FIG. 2). The end cutting grooves 34 support the screw 20 to cut wood fibers effectively.

Figure 2:
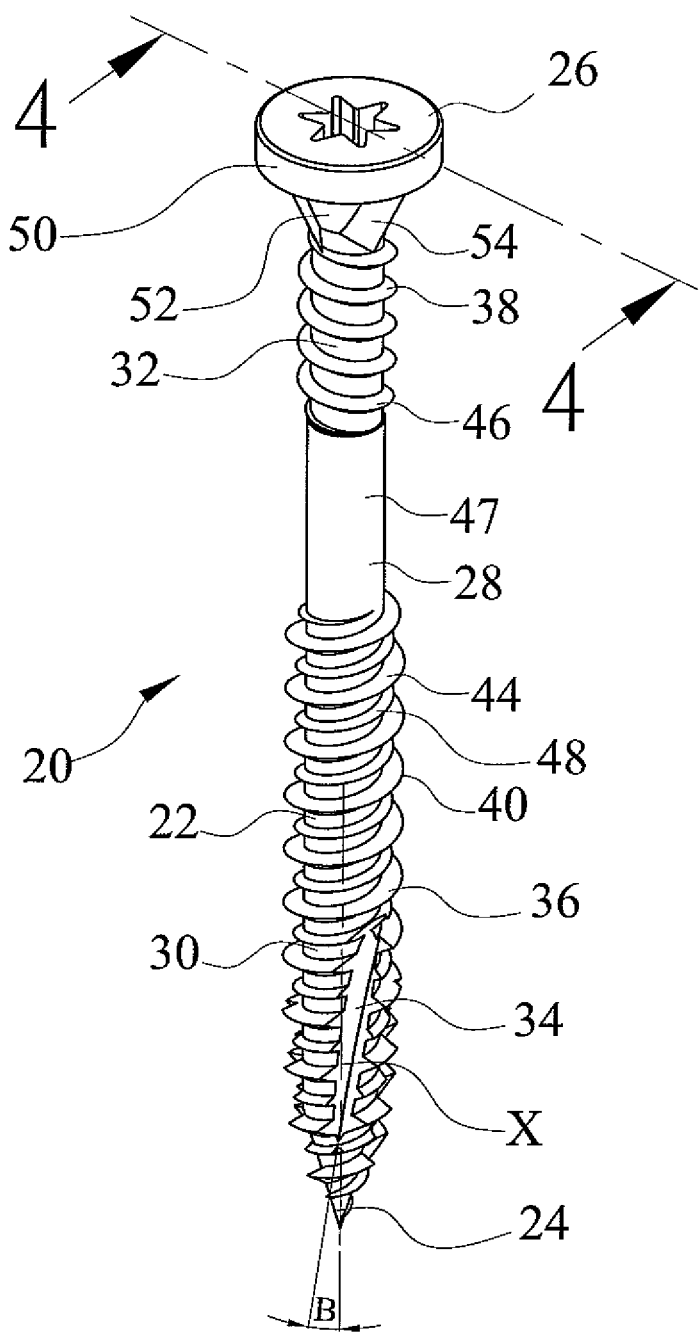
FIG. 2 is a perspective view of a screw according to an embodiment of the present invention.
Figure 3:
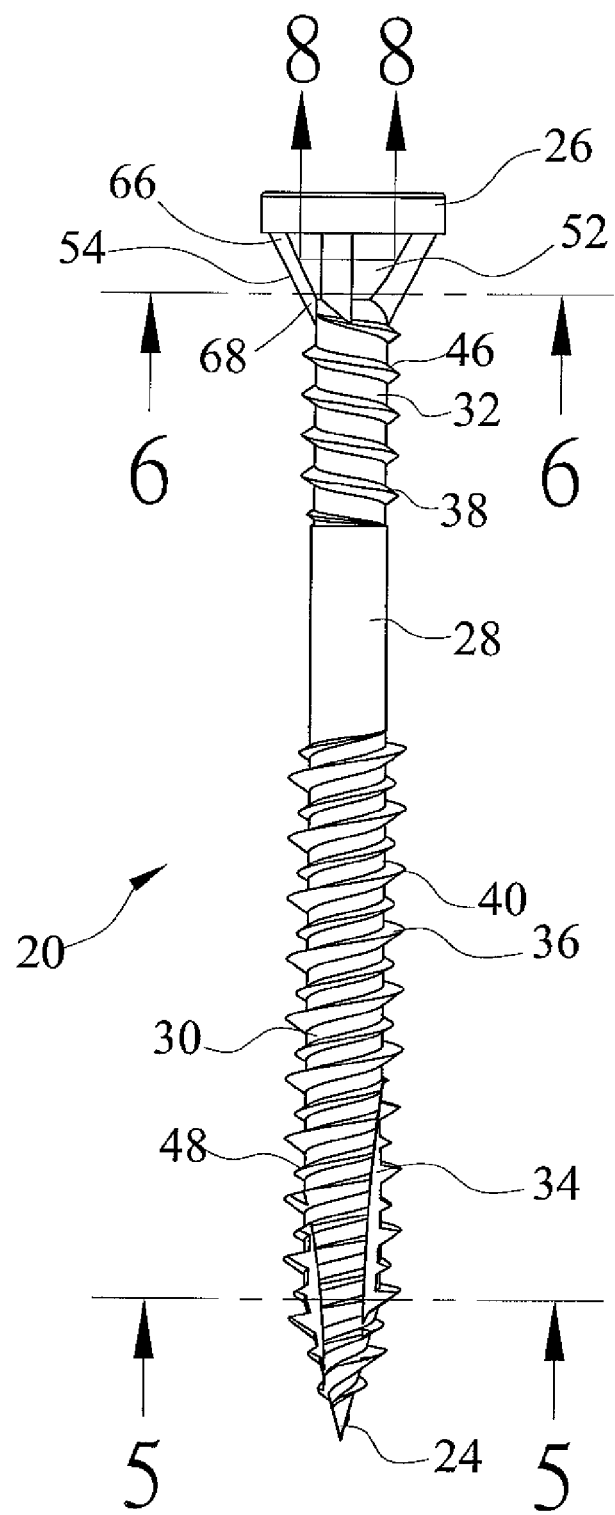
FIG. 3 is an elevational view of the screw of FIG. 2.

The screw 20 further includes a first thread 36 and a second thread 38. The first thread 36 is spirally formed on an outer circumference of the lower section 30 of the shank 22 and includes a plurality of asymmetrical thread convolutions 40 (see FIG. 7). Each of the thread convolutions 40 has a first cutting face 42 toward a screw-in side (facing onto the insertion tip 24) and a second cutting face 44 toward a screw-out side (backing onto the insertion tip 24). An included angle (C1) between the first cutting face 42 and a horizontal axis perpendicular to longitudinal axis (X) is 35±10 degrees (between 25 and 45 degrees) preferably and is 35±5 degrees (between 30 and 40 degrees) optimally. An included angle (C2) between the second cutting face 44 and the horizontal axis is 13±10 degrees (between 3 and 23 degrees) preferably and is 13±5 degrees (between 8 and 18 degrees) optimally. The second thread 38 is spirally formed on an outer circumference of the upper section 32 of the shank 22 and includes a plurality of thread convolutions 46. An upward spiral direction of the second thread 38 is opposite to that of the first thread 36. As shown in FIG. 2, the upward spiral direction of the first thread 36 is similar to the upward extending direction of the end cutting groove 34 (upwardly and slantingly to the upper right).

In this embodiment, a non-threaded portion 47 exists between the lower and upper sections 30 and 32 of the shank 22. The screw 20 further includes a third thread 48 spirally and circumferentially arranged on the lower section 30 of the shank 22 and spaced from the first thread 36. The third thread 48 is less than the first thread 36 in a thread height. Moreover, the third thread 48 includes a plurality of asymmetrical thread convolutions (FIG. 7), each of which has a lower cutting face 49 (facing onto the insertion tip 24) and an upper cutting face 51 (backing onto the insertion tip 24). An included angle (C3) between the lower cutting face 49 and the horizontal axis is 35±10 degrees (between 25 and 45 degrees) preferably, and is 35±5 degrees (between 30 and 40 degrees) optimally. An included angle (C4) between the upper cutting face 51 and the horizontal axis is 13±10 degrees (between 3 and 23 degrees) preferably, and is 13±5 degrees (between 8 and 18 degrees) optimally.

Figure 4:
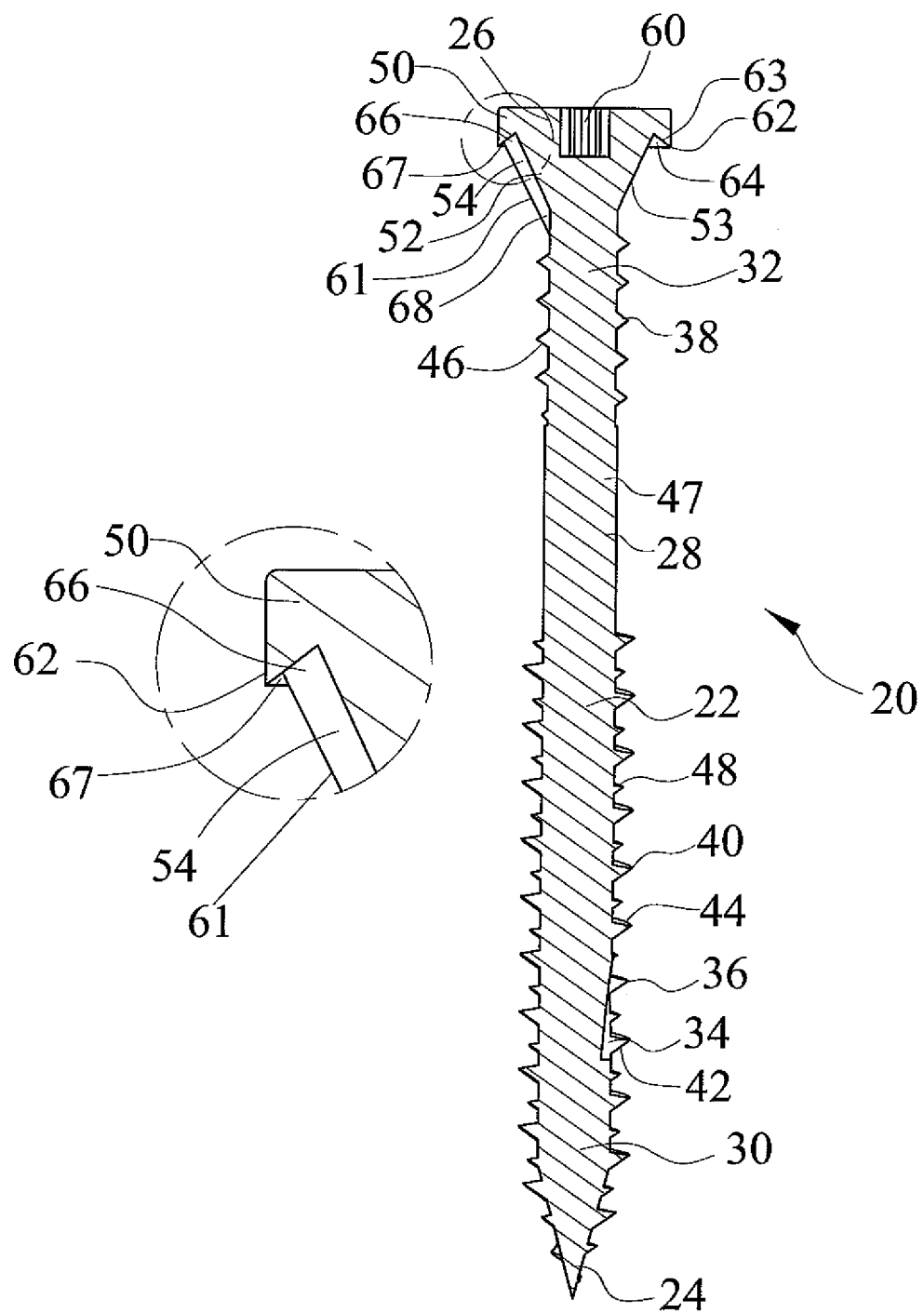
FIG. 4 is a sectional view taken along line 4-4 of FIG. 2.
Figure 5:
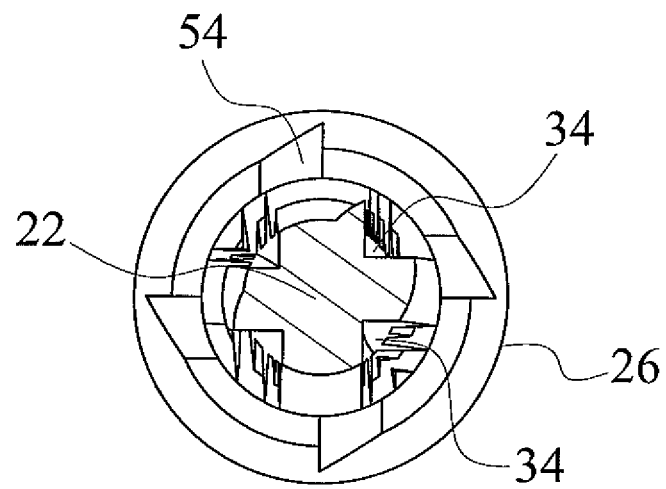
FIG. 5 is a sectional view taken along line 5-5 of FIG. 3.
Figure 6:
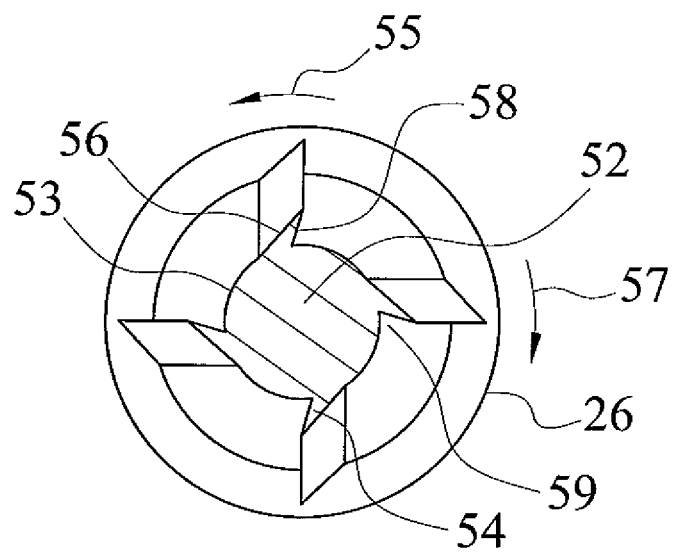
FIG. 6 is a sectional view taken along line 6-6 of FIG. 3.
Figure 7:
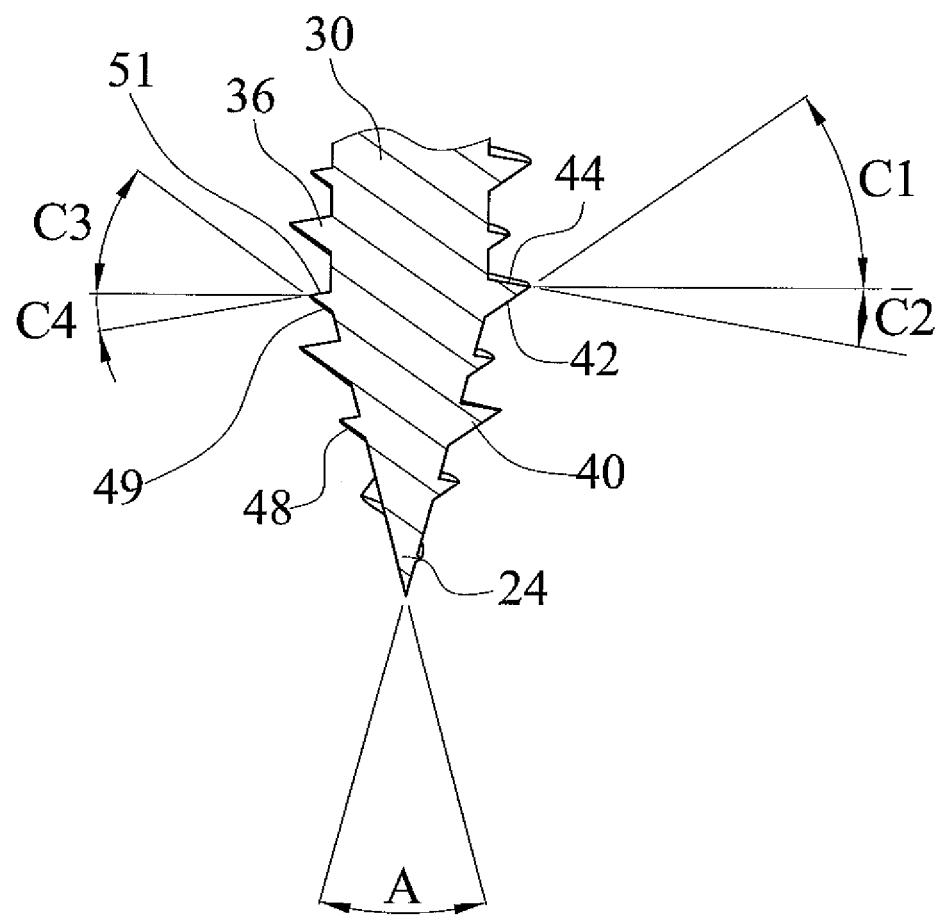
FIG. 7 is a partial, enlarged view of the screw of FIG. 4.

The head end 26 is greater than the straight portion 28 in an outer diameter and includes an upper portion 50 and a lower portion 52 which is adjacent to an upper end of the straight portion 28 and tapered toward the straight portion 28. A plurality of anti-screw-out teeth 54 protrude from a circumferential surface 53 of the lower portion 52 (FIG. 4). In this embodiment, the circumferential surface 53 of the lower portion 52 has circular cross-sections and is provided with four anti-screw-out teeth 54 circumferentially designed on the lower portion 52 and spaced from one another at a constant angle (FIG. 6). Each anti-screw-out tooth 54 displays a roughly triangular cross-section and includes a guide face 56 and a stop face 58, both of which intersect each other for development of a ridgeline 61.

Figure 8:
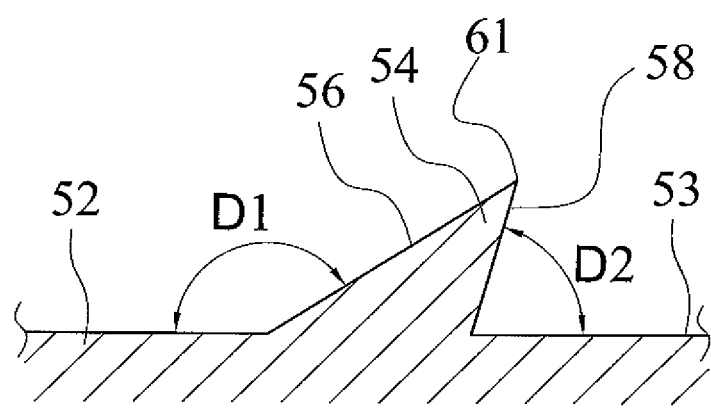
FIG. 8 is a sectional view taken along line 8-8 of FIG. 3.

To effectively guide the screw 20 to move in a screw-in direction 55, the guide face 56 obliquely or curvedly extends outward from the circumferential surface 53 in a tangential manner. Furthermore, a recessed channel 59 is formed between the stop face 58 and the circumferential surface 53 for receiving wood chips, so that a plank can be securely fixed with the screws 20. In this embodiment, an included angle (D1) between the guide face 56 and the circumferential surface 53 of the lower portion 52 is between 90 and 180 degrees and is between 150 and 180 degrees preferably (FIG. 8). An included angle (D2) between the stop face 58 and the circumferential surface 53 of the lower portion 52 is less than 90 degrees and between 30 and 90 degrees preferably as well as between 45 and 85 degrees optimally, enhancing resistances in a screw-out direction 57 and accommodating more wood chips inside the lower portion 52. A socket 60 is disposed in an upper surface of the upper portion 50 for a screwdriver (not shown) to insert into. At the bottom of the upper portion 50 is circumferentially designed a pointed cutting portion 62 by which wood chips or debris can be cut. In this embodiment, an outer diameter of the upper portion 50 is greater than that of a top end of the lower portion 52. A slope 63 is provided on an inner side of the cutting portion 62, and a recess 64 is formed between the cutting portion 62 and the circumferential surface 53 of the top end of the lower portion 52. The ridgeline 61 of each anti-screw-out tooth 54 extends into the recess 64. Moreover, each anti-screw-out tooth 54 includes an upper end 66 and a lower end 68 which extends to the upper section 32 of the straight portion 28. The upper end 66 of ridgeline 61 of each anti-screw-out tooth 54 connects with the slope 63 of the cutting portion 62 or is adjacent to the cutting portion 62. Furthermore, a gap 67 is formed between the upper end 66 of each anti-screw-out tooth 54 and the bottom edge of the cutting portion 62 (see FIG. 4), so that wood fibers which were stretched and pinched off by the cutting portion 62 and downward compressed by the upper portion 50 do not come out from a drilled hole for surface flatness of a plank cut by the cutting portion 62.

Figure 9:
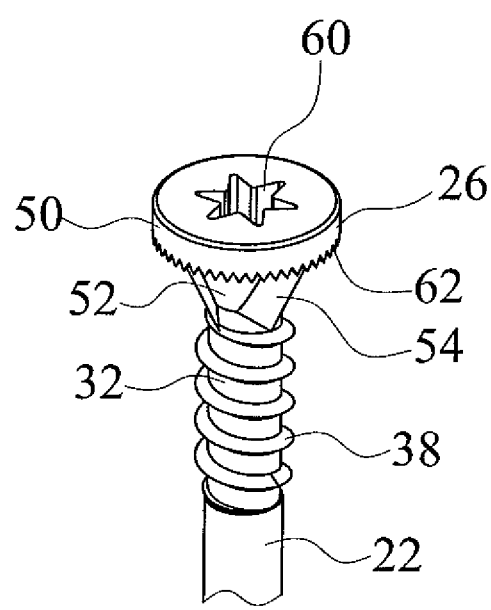
FIG. 9 is a partial, perspective view of a screw according to another embodiment of the present invention.
Figure 10:
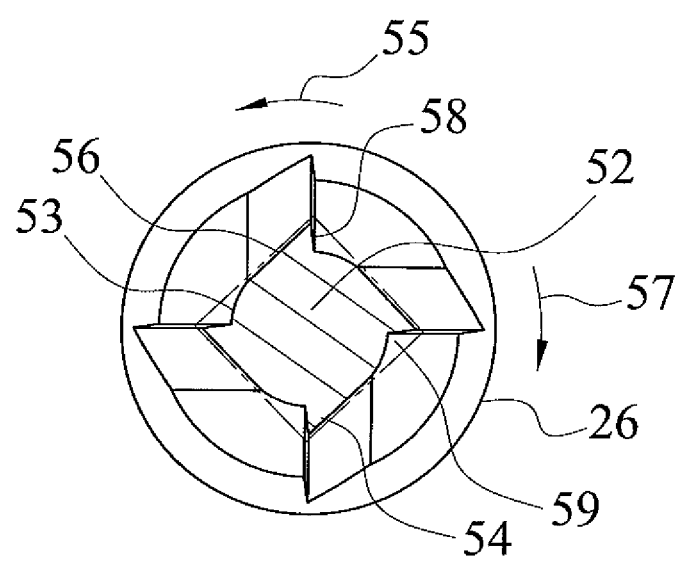
FIG. 10 is a sectional view similar to FIG. 6, illustrating anti-screw-out teeth of the present invention in another embodiment.

FIG. 9 illustrates the cutting portion 62 is serrated in an alternative embodiment. FIG. 10 illustrates an alternative embodiment for the anti-screw-out teeth 54, wherein the lower portion 52 displays a roughly square cross-section (indicated as phantom lines in FIG. 10) with each guide face 56 extending outwardly from the circumferential surface 53 in a tangential manner. Moreover, the stop face 58 and the circumferential surface 53 of the lower portion 52 form an included angle greater than 90 degrees. The screw 20 can be screwed into a plank (work-piece) smoothly and completely because contact surfaces between the circumferential surface 53 and the plank as well as resistances to the screw 20 in a screw-in direction are reduced by the quadrangular-cross-section lower portion 52. Furthermore, the recessed channel 59 between the stop face 58 and the curved circumferential surface 53 also enhances anti-screw-out effect.

When in use, the screw 20 is screwed into planks (not shown in figures) to be interlocked together with the insertion tip 24. Since the upward extending direction of the end cutting grooves 34 is the same as the upward spiral direction of the first thread 36 of the lower section 30, and when the insertion tip 24 of the screw 20 is screwed into the planks, the end cutting grooves 34 and the first thread 36 will cut the planks at the same time while screwing into planks, which sustains fewer resistances in the screw-in direction when debris induced is squeezed into the end cutting grooves 34.

The screw 20 of the present disclosure features advantages as follows:

1. The screw 20 which exerts force enhanced by the first cutting faces 42 of the asymmetrical thread convolutions 40 in the screw-in direction to penetrate the plank is not pulled out easily because of supports of the second cutting faces 44. Thus, the screw 20 is able to secure the plank with bonding force and pull-out force enhanced.

2. Surface flatness of the plank is promoted because wood chips or debris on a plank is cut by the cutting portion 62 of the head end 26 for trimming an opening of a drilled hole.

3. The head end 26 which is directed by the guide faces 56 of the anti-screw-out teeth 54 with the screw 20 penetrating the plank can be completely embedded into the plank. In addition, the screw 20 will not be loosened or pulled out from the plank because the stop faces 58 of the anti-screw-out teeth 54 contact the plank.

4. The capacity of the screw 20 to cut wood fibers is effectively enhanced by the end cutting grooves 34 circumferentially incised on the shank 22 and spaced from one another at a constant angle.

Figure 11:
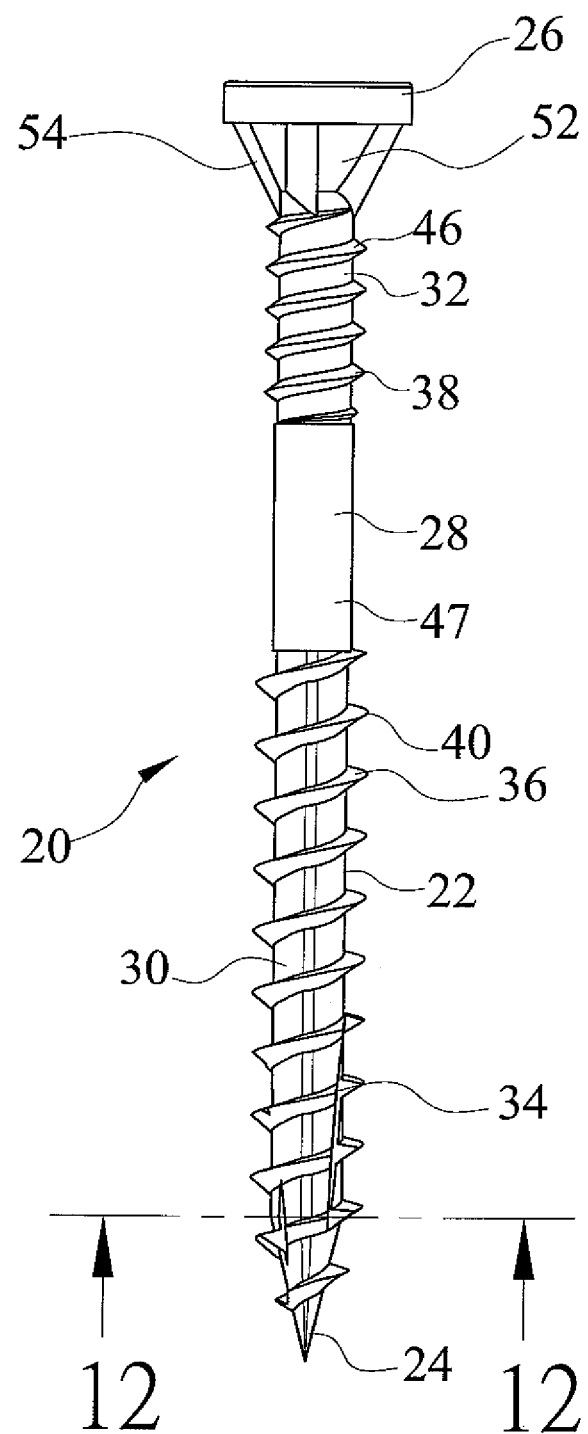
FIG. 11 is a plan view of a screw according to a further embodiment of the present invention.
Figure 12:
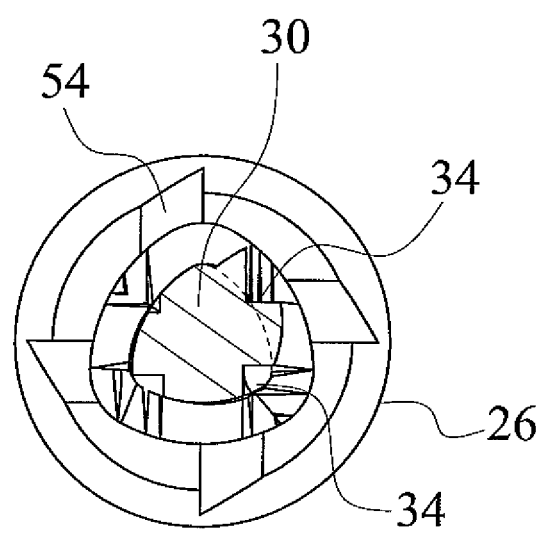
FIG. 12 is a sectional view taken along line 12-12 of FIG. 11.

FIGS. 11 and 12 illustrate a screw 20 in another embodiment. In this embodiment, the lower section 30 has roughly triangular cross-sections, and the upper section 32 has roughly circular cross-sections. Moreover, the second thread 38 is identical to the first thread 36 in the upward-spin direction. Resistances to the screw 20 in the screw-in direction are decreased because the triangular-cross-sections of the lower section 30 are in favor of discharge of debris from the plank. The first and second threads 36 and 38 are designed as forward-direction threads, enhancing guiding effect. As such, the screw 20 in this embodiment is applicable to a rigid (high-density) plank to be connected.

Figure 13:
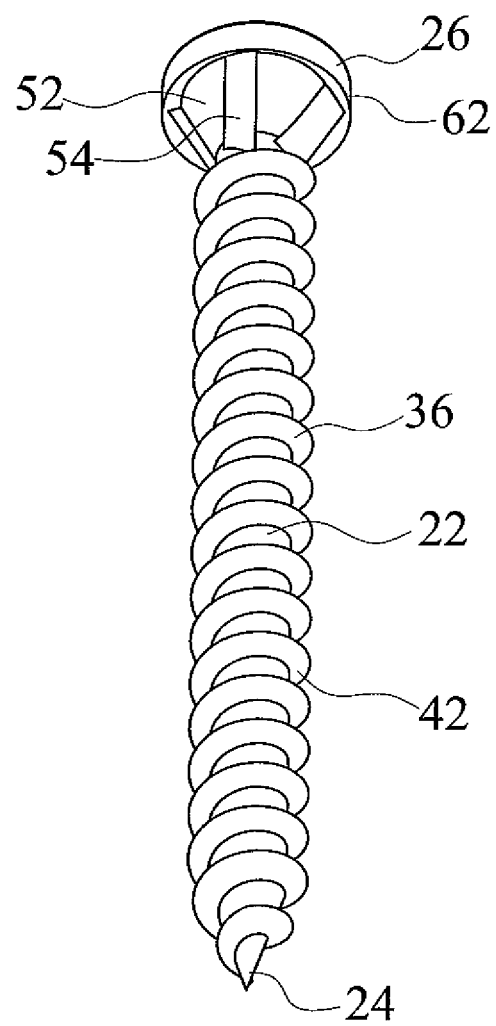
FIG. 13 is a perspective view of a screw according to yet another embodiment of the present invention.

FIG. 13 illustrates a screw 20 in a further embodiment. In this embodiment, the first thread 36 rather than the second thread 38 is designed on the shank 22 and no non-threaded portion exists between the lower section 30 and the upper section 32.

The scope of the invention is to be indicated by the appended claims, rather than by the foregoing description, and all changes which come within the meaning and range of equivalency of the claims are intended to be embraced therein.

The invention claimed is:

1. A screw comprising:
a shank including an insertion tip and a head end spaced from the insertion tip along a longitudinal axis, with the shank further including a straight portion between the insertion tip and the head end, with the head end being greater than the straight portion in an outer diameter and including an upper portion and a lower portion which is adjacent to and tapered toward the straight portion, with the upper portion provided with a pointed cutting portion circumferentially designed at a bottom thereof, with a plurality of anti-screw-out teeth protruding from a circumferential surface of the lower portion, with each anti-screw-out tooth including a guide face and a stop face, with an included angle between the guide face and the circumferential surface of the lower portion being between 90 and 180 degrees, with a recessed channel formed between the stop face and the circumferential surface of the lower portion; and
a first thread spirally disposed on the straight portion of the shank and including a plurality of asymmetrical thread convolutions, with each of the asymmetrical thread convolutions having a first cutting face facing onto the insertion tip and a second cutting face backing onto the insertion tip, with an included angle between the first cutting face and a horizontal axis perpendicular to the longitudinal axis being between 25 and 45 degrees, with an included angle between the second cutting face and the horizontal axis being between 3 and 23 degrees.

2. The screw according to claim 1, wherein the circumferential surface of the lower portion is provided with four anti-screw-out teeth spaced from one another at a constant angle, with the guide face of each anti-screw-out tooth curvedly extending outward from the circumferential surface in a tangential manner, with an included angle between the stop face and the circumferential surface of the lower portion being less than 90 degrees.

3. The screw according to claim 2, wherein the included angle between the stop face and the circumferential surface of the lower portion is between 45 and 85 degrees.

4. The screw according to claim 1, wherein the circumferential surface of the lower portion has circular cross-sections and is provided with four anti-screw-out teeth spaced from one another at a constant angle, with the guide face of each anti-screw-out tooth extending outward from the circumferential surface in a tangential manner, with the lower portion having a roughly square cross-section, with an included angle between the stop face and the circumferential surface of the lower portion being greater than 90 degrees.

5. The screw according to claim 1, wherein the straight portion includes a lower section disposed near the insertion tip and an upper section disposed near the head end, with at least one end cutting groove disposed in the lower section of the straight portion, wherein an included angle formed between an extending direction of the end cutting groove and the longitudinal axis is between 3 and 9 degrees.

6. The screw according to claim 5, wherein a second thread is spirally disposed on an outer circumference of the upper section of the straight portion, with the first thread spirally disposed on an outer circumference of the lower section of the straight portion, with a third thread spirally and circumferentially arranged on the lower section of the straight portion, with the third thread being less than the first thread in a thread height, with the third thread including a plurality of asymmetrical thread convolutions each having a lower cutting face facing onto the insertion tip and an upper cutting face backing onto the insertion tip, with an included angle between the lower cutting face and the horizontal axis being between 25 and 45 degrees, with an included angle between the upper cutting face and the horizontal axis being between 3 and 23 degrees.

7. The screw according to claim 1, wherein the straight portion includes a lower section disposed near the insertion tip and an upper section disposed near the head end, with the lower section having roughly triangular transverse cross sections, with the upper section having circular transverse cross sections.

8. The screw according to claim 1, wherein an outer diameter of the upper portion of the head end is greater than an outer diameter of a top end of the lower portion, with a slope provided on an inner side of the cutting portion, with a recess formed between the cutting portion and the circumferential surface of the top end of the lower portion of the head end.

9. The screw according to claim 8, wherein the cutting portion is serrated.

10. The screw according to claim 8, wherein the straight portion includes a lower section disposed near the insertion tip and an upper section disposed near the head end, with each anti-screw-out tooth including an upper end extending into the recess and a lower end extending to the upper section of the straight portion, with the upper end of each anti-screw-out tooth connecting with the slope of the cutting portion or being adjacent to the cutting portion.

11. The screw according to claim 10, wherein the circumferential surface of the lower portion is provided with four anti-screw-out teeth spaced from one another at a constant angle, with at least one end cutting groove disposed in the lower section of the straight portion, wherein an included angle formed between an extending direction of the end cutting groove and the longitudinal axis is between 3 and 9 degrees.

12. The screw according to claim 1, wherein the circumferential surface of the lower portion is provided with four anti-screw-out teeth spaced from one another at a constant angle, with the straight portion including a lower section disposed near the insertion tip and an upper section disposed near the head end, with at least one end cutting groove disposed in the lower section of the straight portion, wherein an included angle formed between an extending direction of the end cutting groove and the longitudinal axis is between 3 and 9 degrees.

13. The screw according to claim 12, wherein the lower section has roughly triangular transverse cross sections, with the upper section having circular transverse cross sections.

14. The screw according to claim 1, wherein the straight portion includes a lower section disposed near the insertion tip and an upper section disposed near the head end, with a second thread spirally disposed on an outer circumference of the upper section of the straight portion, with the first thread spirally disposed on an outer circumference of the lower section of the straight portion, with a non-threaded portion formed between the lower and upper sections of the straight portion, with an upward spiral direction of the second thread being opposite to that of the first thread.

15. The screw according to claim 14, wherein a third thread is spirally and circumferentially arranged on the lower section of the straight portion, with the third thread including a plurality of asymmetrical thread convolutions each having a lower cutting face facing onto the insertion tip and an upper cutting face backing onto the insertion tip, with an included angle between the lower cutting face and the horizontal axis being between 25 and 45 degrees, with an included angle between the upper cutting face and the horizontal axis being between 3 and 23 degrees.

* * * * *